United States Patent
Arai

(10) Patent No.: US 6,169,710 B1
(45) Date of Patent: Jan. 2, 2001

(54) OPTICAL DISC RECORDING/REPRODUCING METHOD AND APPARATUS

(75) Inventor: Toru Arai, Tokyo (JP)

(73) Assignee: NEC Corporation (JP)

( * ) Notice: Under 35 U.S.C. 154(b), the term of this patent shall be extended for 0 days.

(21) Appl. No.: 09/352,396

(22) Filed: Jul. 13, 1999

(30) Foreign Application Priority Data

Jul. 31, 1998 (JP) .................................................. 10-218107

(51) Int. Cl.$^7$ .................................................. G11B 17/22
(52) U.S. Cl. .................................................. 369/32; 369/54
(58) Field of Search .................................. 369/32, 54, 58, 369/47, 48, 275.3, 44.26

(56) References Cited

U.S. PATENT DOCUMENTS

| 4,813,011 | * | 3/1989 | Kulakowski et al. . | |
| 5,218,590 | * | 6/1993 | Miyasaka | 369/54 |
| 5,235,585 | * | 8/1993 | Bish et al. | 369/54 |
| 5,303,219 | * | 4/1994 | Kulakowski et al. | 369/54 |
| 5,319,626 | * | 6/1994 | Ozaki et al. | 369/54 |
| 5,715,221 | * | 2/1998 | Ito et al. | 369/54 |

FOREIGN PATENT DOCUMENTS

| 57-094913 | 6/1982 | (JP) . |
| 61-000973 | 1/1986 | (JP) . |
| 61-080564 | 4/1986 | (JP) . |
| 4266117 | 9/1992 | (JP) . |

* cited by examiner

Primary Examiner—Tan Dinh
(74) Attorney, Agent, or Firm—Hayes, Soloway, Hennessey, Grossman & Hage

(57) ABSTRACT

The present invention provides a data recording/reproducing method not lowering the throughput while performing a defect processing. According to this method, a read error is monitored when a data is read out from an address X of the optical disc by an optical head block. If a read error is caused, the optical head block is made to retry the read out from the address X and a retry count is recorded in the memory each time retry is performed. When the read out from the address X is successful, the retry count stored in the memory is read out so as to be compared to a predetermined value. If the retry count exceeds the predetermined value, an alternative address Y is allocated on the optical disc to replace the address X and the data which has been read out from the address X is copied in the address Y, and the DMA (defect management area) of the optical disc is rewritten so that the data is read out from the address Y when an instruction to read out the address X is issued from an upper node apparatus.

11 Claims, 3 Drawing Sheets

OPTICAL DISC RECORDING/REPRODUCING METHOD AND APPARATUS

BACKGROUND OF THE INVENTION

1. Field of the Invention

The present invention relates to an optical disc recording/reproducing method and apparatus as well as to a medium containing an optical disc recording/reproducing program and in particular, to an optical disc recording/reproducing method capable of performing a defect processing.

2. Description of the Related Art

Conventionally, there has been an optical disc apparatus having a defect function during a data writing. That is, when an access is made to an address X of an optical disc for writing a data, if a data write error is caused, an alternative address Y is assigned instead of the address X, so that a data to be recorded in address X is recorded in the address Y. When an access is made to the address X during a read operation, the address Y is addressed instead of the address X so as to read out a necessary data. Thus, use of a bad spot on the optical disc is eliminated, thus improving the reliability of the optical disc.

The optical disc has a recording area including: a user area for recording and reproducing a normal data onto/from the optical disc; a spare area allocated for defect processing, a defect management area (DMA) for recording the correspondence between the user area address and the spare area address. In this case of defect processing, an address Y of the spare area is used instead of the address X of the user area. The information that the address X is replaced by the address Y is recorded in the DMA.

On the other hand, there is a case a data item which has been correctly written during a write process may cause an error when being read out. In this case, the optical disc apparatus performs retry of the data read out, thus enabling to read out a necessary data and assuring reliability of data read out.

However, if the address requiring retry is repeatedly accessed during a data read, this significantly lowers a throughput of the optical disc apparatus.

SUMMARY OF THE INVENTION

It is therefore an object of the present invention to provide an optical disc recording/reproducing method and apparatus for suppressing the throughput lowering due to repeated retries caused by a read out error.

Another object of the present invention is to provide and an optical disc apparatus and method capable of preventing lowering of a throughput and increasing the data reliability when reproducing an optical disc which has been used in an apparatus causing a number of read errors.

The present invention provides a data recording/reproducing method for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, the method comprising steps of: monitoring a read out error during a data read by the optical head block from an address X of the optical disc; executing a read out retry by the optical head from the address X and each time retry is performed, storing the retry count in the memory; reading out the retry count from the memory so as to be compared to a predetermined value if the read out from the address X has been successful; if the retry count exceeds the predetermined value, allocating an alternative address Y on the optical disc to replace the address X, and copying the data which has been read out from the address X, onto address Y; and rewriting a defect management area (DMA) of the optical disc so that a data is read out from the address Y when an instruction is received from an upper node apparatus for reading out from the address X.

DESCRIPTION OF THE PREFERRED EMBODIMENTS

Figure 1:
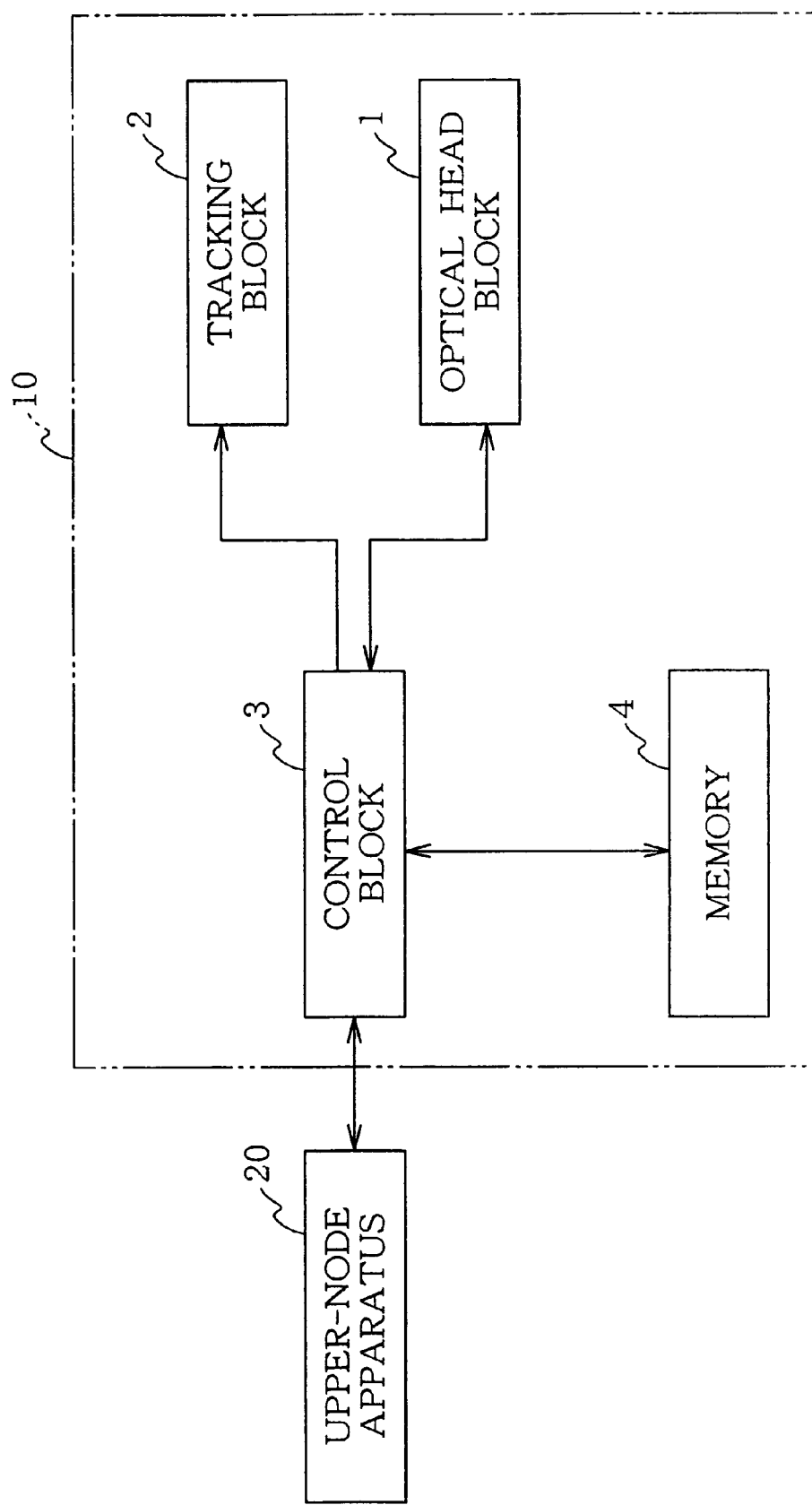
FIG. 1 is a block diagram showing a first embodiment of the present invention.
Figure 2:
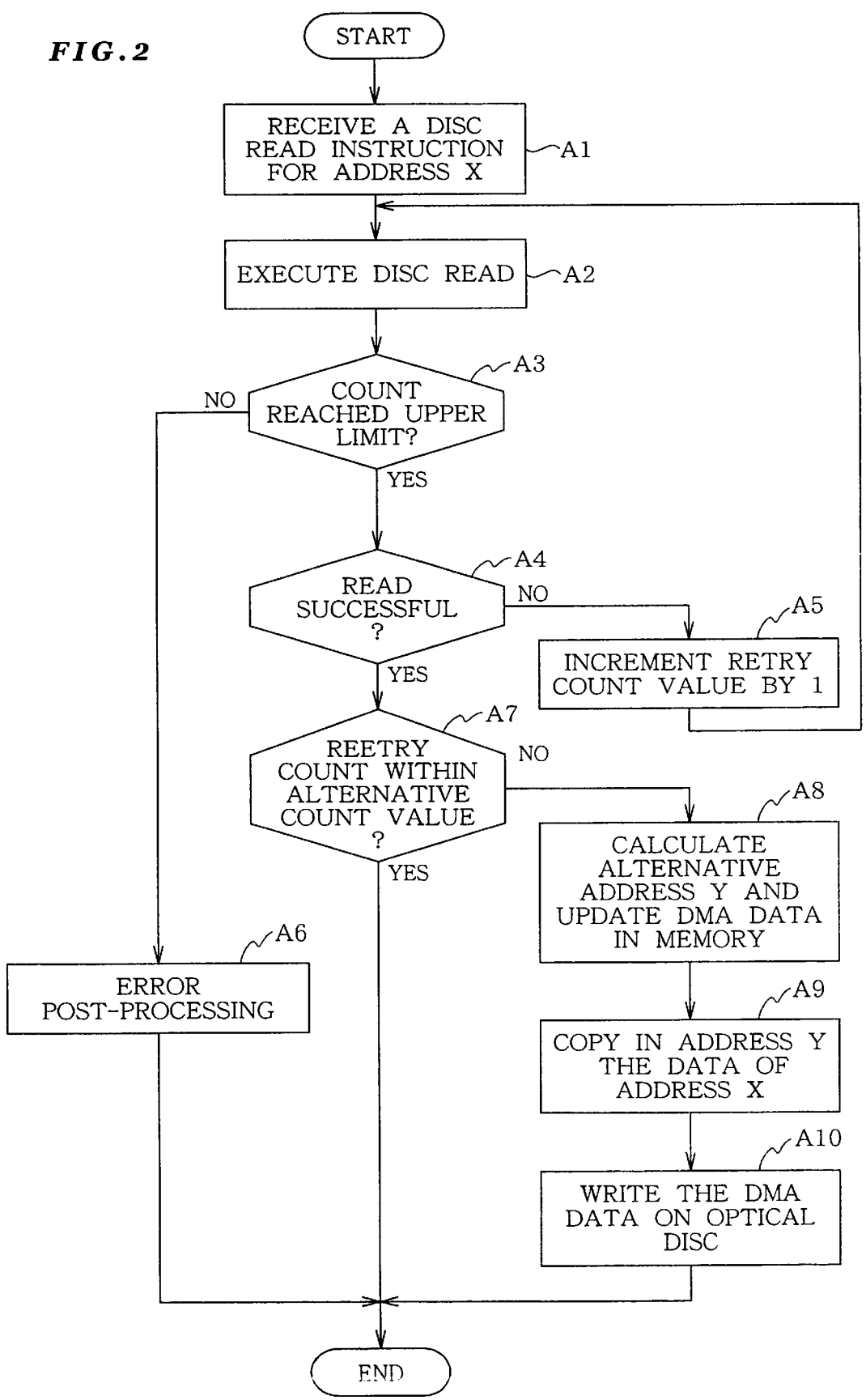
FIG. 2 is a flowchart showing a processing performed by a control block shown in the first embodiment of the of the present invention.

Description will now be directed to the first embodiment of the present invention with reference to FIGS. 1 and 2.

The optical disc recording/reproducing apparatus 10 shown in FIG. 1 comprises: an optical head block 1 for recording and reading a data onto/from an optical disc; a tracking block 2 for positioning the optical head on a predetermined track of the optical disc; a control block 3 for controlling operation of the optical head block 1 and the tracking block 2 according to an instruction from an upper node apparatus; and a memory 4 for temporarily recording a data required for control performed by the control block 3.

If a read error is caused while reading a data from an address X of the optical disc, the control block 3 instructs the optical head 1 to perform retry of the read out of the address X. Each time retry is performed, a retry count is recorded in the memory 4. When read out from the address X is successful, the total count of the retries stored in the memory 4 is read out to be compared to a predetermined reference value. If the total count exceeds the reference value, an alternative address Y is allocated on the optical disc to replace the address X, and the data read out from the address X is copied onto the address Y. The DMA of the optical disc is rewritten so that, a data is read out from the address Y if the upper node apparatus 20 instructs to read out of the address X.

This processing is performed by executing an optical disc recording/reproducing program by a CPU contained in the control block 3. The optical disc recording/reproducing program may be read out from a medium readable by a computer, and executed.

Next, operation of the first embodiment will be explained, referring to FIG. 2. FIG. 2 is a flowchart of a processing executed by the computer of the control block 3.

Firstly, the control block 3 receives a disc read instruction for the address X of the optical disc from an upper node apparatus 20 (A1). In response to this, the control block 3 positions the optical head at a predetermined position using the tracking block 2, and instructs the optical head block 2 to read a data from the address X (executing a disc read, A2). If a read error is caused, retry of the read out is executed from the same address (from A4 to A2). However, if the number of retries exceeds the reference value as an upper limit (A3), read-out is stopped and normal error post-processing is executed (A6). While retry of data read out is performed, the total number of the retries is counted in memory 4 (A5). If a retry of data read from the address X has been successful (A4), the total retry count is read out from the memory 4 so as to be compared to an alternative reference value (A7). If the retry count is within the alternative reference value, the processing is complete. On the other hand, if the retry count exceeds the alternative reference value, the control block 3 executes a defect processing.

That is, an alternative address Y is calculated corresponding to the address X and the DMA data copied in memory 4 from the optical disc is updated. More specifically, information on allocation of the alternative address Y for the address X is written in the DMA data (A8). Subsequently, a data which has been read out from the address X is copied into the address Y (A9), and the DMA data which has been updated in memory 4 is written back to the DMA of the optical disc (A10). After this, when the control block 3 receives a address X read out instruction from the upper node apparatus, the control block 3 controls to read a data from the alternative address Y.

Accordingly, even if an access is made to an address requiring read out retry, the retry is required only for the first access and in a second access and after, a desired data can be read out quickly. Thus, it is possible to suppress lowering of the read out throughput of the optical disc apparatus.

Figure 3:
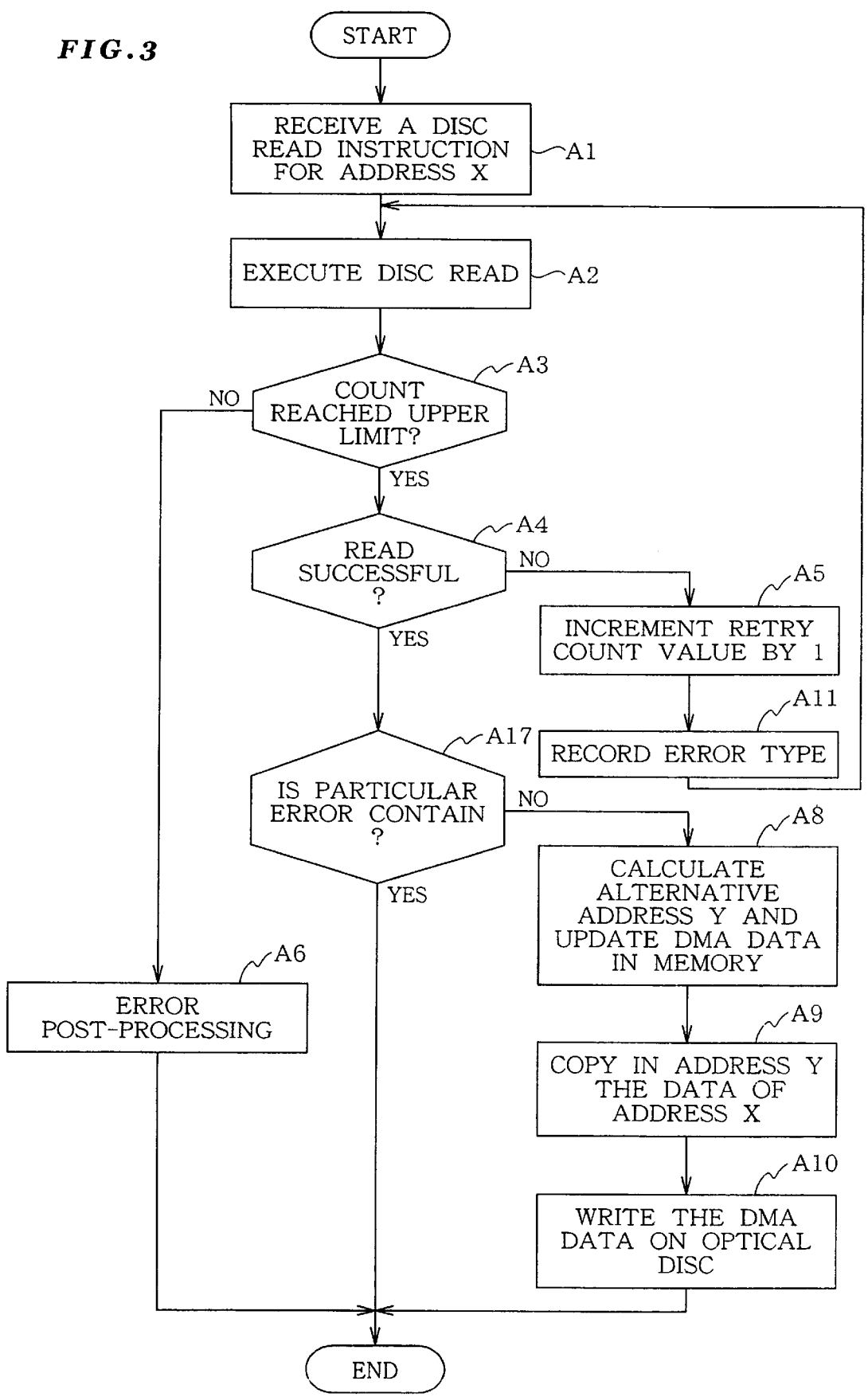
FIG. 3 is a flowchart showing a processing performed by a control block according to a second embodiment of the present invention.

Description will now be directed to a second embodiment of the present invention with reference to FIGS. 1 and 3.

The apparatus according to the second embodiment has an identical configuration with the apparatus of the first embodiment and its explanation is omit ted. Moreover, FIG. 3 shows a processing executed by the control block 3 including identical processes as FIG. 3, which are denoted by the same reference symbols and their explanations are omitted.

In the second embodiment of the present invention, each time a read retry is performed, an error type is stored in memory 4 (A11). Here, the error type may be directly recorded. Alternatively, it is possible to set a flag when a particular error has occurred. After this, if the retry results in a successful data read out from the address X (A4), it is decided whether a particular error specified beforehand has occurred (A17). This decision is made according to the information recorded in memory 4 (A11). As a result, if no particular error is contained, the first time of read out processing is completed, and if a particular error is contained, the defect processing of the first embodiment is executed (A8 to A10). For example, the particular error may be a medium error disabling correct decoding or a secondary error such as contamination with dust, or other medium errors.

As for the error not causing the defect processing, there is an apparatus error such as a seek error. That is, in this embodiment, the defect processing is not executed when retry is caused by an apparatus error. Moreover, even if the error is a medium error, the defect error is not executed if the error has been caused in reading an ID indicating data storage region. If the defect error is executed for the ID error, an alternative new ID region should be accessed, increasing the seek time. That is why the defect processing is not executed if the retry error is an ID error.

Thus, an optical disc which has been mounted on an optical disc apparatus often causing a retry error need not seek processing for the defect processing when mounted on a normal optical apparatus. This prevents lowering of the throughput in the normal optical apparatus.

With the aforementioned configuration, it is possible to obtain the same effects as in the first embodiment. Moreover, it is possible to select whether to execute the defect processing.

Here, in the first and second embodiments, the address X may be a user area and the address Y may be a spare area address.

The present invention having the aforementioned configuration executes defect processing on a data which has been read out by retry during a read out operation and not during a data writing. Accordingly, it is possible to suppress the number of read retries when one and the same address is frequently accessed.

Moreover, the defect processing is executed only when the retry count exceeds a predetermined value. Accordingly, there is no danger of lowering the throughput during a read operation.

Furthermore, when the defect processing is executed only if a particular error is caused in read out retry, the defect processing may not be executed depending on the error type. Accordingly, an optical disc which has been mounted on an apparatus often causing a read error may be mounted on and operated in an apparatus causing less errors without lowering the throughput.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-218107 (Filed on Jul. 31, 1998) including specification, claims, drawings and summary are incorporated herein by reference in its entirety.

What is claimed is:

1. A data recording/reproducing method for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, the method comprising steps of:

monitoring a read out error during a data read by the optical head block from an address X of the optical disc;

executing a read out retry by the optical head from the address X and each time retry is performed, storing the retry count in the memory;

when the read out from the address X is successful, reading out the retry count from the memory so as to be compared to a predetermined value;

if the retry count exceeds the predetermined value, allocating an alternative address Y on the optical disc to replace the address X, and copying the data which has been read out from the address X, onto address Y, and rewriting a defect management area (DMA) of the optical disc so that a data is read out from the address Y when an instruction is received from an upper node apparatus for reading out from the address X.

2. A data recording/reproducing apparatus for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, wherein the control block causes the optical disc recording/reproducing apparatus to operate as follows:

during a data read from an address X of the optical disc, a read out error is monitored;

when a read out error is caused, a read out retry is executed by the optical head block from the address X and each time retry is performed, the retry count is stored in the memory;

when the read out from the address X has been successful, the retry count is read out from the memory so as to be compared to a predetermined value;

if the retry count exceeds the predetermined value, an alternative address Y is allocated on the optical disc to replace the address X, and the data which has been read out from the address X is copied onto address Y; and a defect management area (DMA) of the optical disc is rewritten so that a data is read out from the address Y when an instruction is received from an upper node apparatus to read out from the address X.

3. A data recording/reproducing apparatus for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, wherein the control block includes:

monitoring means for monitoring a read out error during a data read by the optical head block from an address X of the optical disc;

retry means for executing a read out retry by the optical head from the address X and for storing the retry count in the memory each time retry is performed;

comparison means used when the read out from the address X has been successful, for reading out the retry count from the memory so as to be compared to a predetermined value;

copy means used when the retry count exceeds the predetermined value, for allocating an alternative address Y on the optical disc to replace the address X, and for copying the data which has been read out from the address X, onto address Y, and rewriting means for rewriting a defect management area (DMA) of the optical disc so that a data is read out from the address Y when an instruction is received from an upper node apparatus for reading out from the address X.

4. A program product for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; a memory for temporarily recording a data required for control; and a recording medium containing a program which is read by the control block, the program causing the optical disc recording/reproducing apparatus to:

monitor a read out error during a data read by the optical head block from an address X of the optical disc;

execute read out retry by the optical head from the address X and for storing the retry count in the memory each time retry is performed;

when the read out from the address X has been successful, read out the retry count from the memory so as to be compared to a predetermined value;

when the retry count exceeds the predetermined value, allocate an alternative address Y on the optical disc to replace the address X, and copy the data which has been read out from the address X, onto address Y, and rewrite a defect management area (DMA) of the optical disc so that a data is read out from the address Y when an instruction is received from an upper node apparatus for reading out from the address X.

5. A data recording/reproducing method for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, the method comprising steps of:

monitoring a read out error during a data read by the optical head block from an address X of the optical disc;

executing a read out retry by the optical head from the address X and storing a retry count in the memory each time retry is performed;

recording a type of the read out error in the memory;

when the read out from the address X is successful, and if the error type is a defect processing requiring type, reading out the retry count from the memory so as to be compared to a predetermined value, if error is the defect processing requiring type and the retry count exceeds the predetermined value, allocating an alternative address Y on the optical disc to replace the address X, and copying the data which has been read out from the address X, onto address Y; and rewriting a defect management area (DMA) of the optical disc so that a data is read out from the address Y when an instruction is received from an upper node apparatus to read out from the address X.

6. A method as claimed in claim 5, wherein the defect processing requiring error is a demodulation error which has failed in modulation of a reproduced data.

7. A data recording/reproducing method for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control, the method comprising steps of:

monitoring a read out error during a data read by the optical head block from an address X of the optical disc;

executing a read out retry by the optical head from the address X and storing a retry count in the memory each time retry is performed;

recording a type of the read out error in the memory;

when the read out from the address X is successful, and if the error type is a predetermined medium error requiring a defect processing error, reading out the retry count from the memory so as to be compared to a predetermined value and if the error type is a predetermined apparatus error not requiring defect processing, resuming a normal reproduction type;

if the error is a defect processing requiring type and the retry count exceeds the predetermined value, allocating an alternative address Y on the optical disc to replace the address X, and copying the data which has been read out from the address X, onto address Y; and rewriting a defect management area (DMA) of the optical disc so that a data is read out from the address Y when an instruction is received from an upper node apparatus to read out from the address X.

8. A method as claimed in claim 7, the error not requiring a defect processing has an ID error which is a reproduction error of an ID data indicating a data storage address.

9. A method as claimed in claim 7, wherein the error not requiring defect processing has a seek error.

10. A data recording/reproducing apparatus for recording/reproducing a data to/from an optical disc, the apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; and a memory for temporarily recording a data required for control; wherein the control block causes the optical disc recording/reproducing apparatus to:

monitor a read out error during a data read by the optical head block from an address X of the optical disc;

execute a read out retry by the optical head from the address X and store a retry count in the memory each time retry is performed;

record a type of the read out error in the memory;

when the read out from the address X is successful, and if the error type is a predetermined medium error requiring a defect processing error, read out the retry count from the memory so as to be compared to a predetermined value and if the error type is a predetermined apparatus error not requiring defect processing, resume a normal reproduction type;

if the error is a defect processing requiring type and the retry count exceeds the predetermined value, allocate an alternative address Y on the optical disc to replace the address X, and copy the data which has been read out from the address X, onto address Y; and rewrite a defect management area (DMA) of the optical disc so that a data is read out from the address Y when an instruction is received from an upper node apparatus to read out from the address X.

11. A program product for recording/reproducing a data to/from an optical disc using an optical disc recording/reproducing apparatus comprising: an optical head block for recording and reading a data to/from the optical disc; a tracking block for positioning the optical head on a predetermined track of the optical disc; a control block for controlling operation of the optical head block and the tracking block according to an instruction from an upper-node apparatus; a memory for temporarily recording a data required for control; and a recording medium containing a program to be read out by the control block, wherein the program causes the optical disc recording/reproducing apparatus to:

monitor a read out error during a data read by the optical head block from an address X of the optical disc;

execute a read out retry by the optical head from the address X and store a retry count in the memory each time retry is performed;

record a type of the read out error in the memory;

when the read out from the address X is successful, and if the error type is a predetermined medium error requiring a defect processing error, read out the retry count from the memory so as to be compared to a predetermined value and if the error type is a predetermined apparatus error not requiring defect processing, resume a normal reproduction type;

if the error is a defect processing requiring type and the retry count exceeds the predetermined value, allocate an alternative address Y on the optical disc to replace the address X, and copy the data which has been read out from the address X, onto address Y; and rewrite a defect management area (DMA) of the optical disc so that a data is read out from the address Y when an instruction is received from an upper node apparatus to read out from the address X.

* * * * *